US009577881B2

(12) United States Patent
Diab et al.

(10) Patent No.: US 9,577,881 B2
(45) Date of Patent: Feb. 21, 2017

(54) METHOD AND SYSTEM FOR MANAGING QUALITY OF SERVICE VIA A BROADBAND GATEWAY

(75) Inventors: Wael William Diab, San Francisco, CA (US); Jeyhan Karaoguz, Irvine, CA (US); Xuemin Chen, San Diego, CA (US); David Garrett, Tustin, CA (US); David Lundgren, Mill Valley, CA (US); Rich Prodan, Niwot, CO (US)

(73) Assignee: BROADCOM CORPORATION, Irvine, CA (US)

( * ) Notice: Subject to any disclaimer, the term of this patent is extended or adjusted under 35 U.S.C. 154(b) by 1435 days.

(21) Appl. No.: 12/982,213

(22) Filed: Dec. 30, 2010

(65) Prior Publication Data

US 2011/0299410 A1  Dec. 8, 2011

Related U.S. Application Data

(60) Provisional application No. 61/351,696, filed on Jun. 4, 2010.

(51) Int. Cl.
*H04L 12/927* (2013.01)
*H04L 12/24* (2006.01)
(Continued)

(52) U.S. Cl.
CPC .......... *H04L 41/0816* (2013.01); *G05B 13/02* (2013.01); *G05F 1/66* (2013.01); *G06F 21/10* (2013.01); *G06F 21/6245* (2013.01); *G06Q 20/10* (2013.01); *G06Q 30/0215* (2013.01); *G06Q 30/0226* (2013.01); *G06Q 30/04* (2013.01); *G06Q 40/12* (2013.12); *H04L 12/1453* (2013.01); *H04L 12/2801* (2013.01); *H04L 12/2838* (2013.01); *H04L 12/6402* (2013.01); *H04L 12/66* (2013.01);
(Continued)

(58) Field of Classification Search
CPC ..... H04L 45/302; H04L 47/805; H04W 52/26; H04W 52/265
See application file for complete search history.

(56) References Cited

U.S. PATENT DOCUMENTS

2001/0022785 A1* 9/2001 Pessi ............................. 370/352
2003/0026232 A1* 2/2003 Uskela ......................... 370/341
(Continued)

*Primary Examiner* — Andrew Chriss
*Assistant Examiner* — Salvadore E Rivas
(74) *Attorney, Agent, or Firm* — Foley & Lardner LLP

(57) ABSTRACT

Aspects of a method and system for managing quality of service via a broadband gateway are provided. In this regard, a broadband gateway that supports one or more first QoS protocols may determine, based on communications with a plurality of communication devices, whether each of the plurality of communication devices supports the one or more first QoS protocols. The gateway may communicate a result of the determination to a content provider and/or service provider. In this manner, the content provider and/or service provider may determine whether to utilize one or more second QoS protocols to deliver content to a particular one of said plurality of communication devices based on whether said particular of communication devices based on whether said particular one of said plurality of communication devices supports the one or more first QoS protocols. The gateway may be operable to map between QoS protocols.

2 Claims, 7 Drawing Sheets

(51) Int. Cl.

| | | |
|---|---|---|
| H04L 29/06 | (2006.01) | |
| H04W 12/08 | (2009.01) | |
| H04N 21/63 | (2011.01) | |
| H04L 29/08 | (2006.01) | |
| H04L 12/28 | (2006.01) | |
| G06F 21/62 | (2013.01) | |
| H04L 12/64 | (2006.01) | |
| H04W 52/26 | (2009.01) | |
| G06Q 20/10 | (2012.01) | |
| H04L 12/857 | (2013.01) | |
| G06Q 30/02 | (2012.01) | |
| G06F 21/10 | (2013.01) | |
| G06Q 40/00 | (2012.01) | |
| G05B 13/02 | (2006.01) | |
| G05F 1/66 | (2006.01) | |
| G06Q 30/04 | (2012.01) | |
| H04L 12/14 | (2006.01) | |
| H04L 12/66 | (2006.01) | |
| H04N 5/445 | (2011.01) | |
| H04N 21/482 | (2011.01) | |
| H04N 21/436 | (2011.01) | |
| H04N 21/454 | (2011.01) | |
| H04N 21/6371 | (2011.01) | |
| H04N 21/6373 | (2011.01) | |
| H04N 21/472 | (2011.01) | |
| H04L 12/725 | (2013.01) | |
| H04N 21/258 | (2011.01) | |
| H04N 21/6543 | (2011.01) | |

(52) U.S. Cl.
CPC ........ *H04L 29/06095* (2013.01); *H04L 41/32* (2013.01); *H04L 47/2491* (2013.01); *H04L 47/805* (2013.01); *H04L 63/02* (2013.01); *H04L 63/0281* (2013.01); *H04L 63/10* (2013.01); *H04L 63/20* (2013.01); *H04L 63/205* (2013.01); *H04L 65/102* (2013.01); *H04L 65/103* (2013.01); *H04L 65/1023* (2013.01); *H04L 65/1033* (2013.01); *H04L 65/1036* (2013.01); *H04L 65/40* (2013.01); *H04L 67/10* (2013.01); *H04L 67/104* (2013.01); *H04L 67/1078* (2013.01); *H04L 67/1095* (2013.01); *H04L 67/12* (2013.01); *H04L 67/16* (2013.01); *H04L 67/2842* (2013.01); *H04N 5/445* (2013.01); *H04N 21/43615* (2013.01); *H04N 21/454* (2013.01); *H04N 21/482* (2013.01); *H04N 21/632* (2013.01); *H04N 21/6371* (2013.01); *H04N 21/6373* (2013.01); *H04W 12/08* (2013.01); *H04W 52/265* (2013.01); *G06F 2221/07* (2013.01); *H04L 41/5019* (2013.01); *H04L 45/302* (2013.01); *H04L 65/4084* (2013.01); *H04L 2012/2849* (2013.01); *H04N 21/258* (2013.01); *H04N 21/47202* (2013.01); *H04N 21/6543* (2013.01); *Y02B 60/43* (2013.01)

(56) References Cited

U.S. PATENT DOCUMENTS

| | | | |
|---|---|---|---|
| 2003/0101459 A1* | 5/2003 | Edson | 725/82 |
| 2003/0156543 A1 | 8/2003 | Sahinoglu et al. | |
| 2006/0274765 A1* | 12/2006 | Savoor et al. | 370/401 |
| 2007/0180073 A1* | 8/2007 | Paul et al. | 709/220 |
| 2007/0206513 A1 | 9/2007 | Cho et al. | |
| 2007/0286117 A1* | 12/2007 | Balasubramanian et al. | 370/328 |
| 2008/0159304 A1 | 7/2008 | Ozugur et al. | |
| 2008/0232243 A1* | 9/2008 | Oren et al. | 370/216 |
| 2008/0285576 A1* | 11/2008 | Teener et al. | 370/403 |
| 2009/0034428 A1* | 2/2009 | Jeong | 370/252 |
| 2010/0184411 A1 | 7/2010 | Chen et al. | |
| 2010/0184414 A1 | 7/2010 | Abraham et al. | |
| 2010/0184450 A1 | 7/2010 | Chen et al. | |
| 2010/0186027 A1 | 7/2010 | Hou et al. | |
| 2010/0210239 A1 | 8/2010 | Karaoguz et al. | |
| 2010/0215029 A1 | 8/2010 | Karaoguz et al. | |
| 2010/0220692 A1 | 9/2010 | Diab et al. | |
| 2010/0220731 A1 | 9/2010 | Diab et al. | |

\* cited by examiner

METHOD AND SYSTEM FOR MANAGING QUALITY OF SERVICE VIA A BROADBAND GATEWAY

CLAIM OF PRIORITY

This patent application makes reference to, claims priority to and claims benefit from U.S. Provisional Patent Application Ser. No. 61/351,696 filed on Jun. 4, 2010.

The above stated application is hereby incorporated herein by reference in its entirety.

INCORPORATION BY REFERENCE

This application also makes reference to:
U.S. patent application Ser. No. 12/982,231 filed on Dec. 30, 2010;
U.S. patent application Ser. No. 12/982,355 filed on Dec. 30, 2010;
U.S. patent application Ser. No. 12/981,971 filed on Dec. 30, 2010;
U.S. patent application Ser. No. 12/981,993 filed on Dec. 30, 2010;
U.S. patent application Ser. No. 12/982,216 filed on Dec. 30, 2010;
U.S. patent application Ser. No. 12/982,433 filed on Dec. 30, 2010;
U.S. patent application Ser. No. 12/982,205 filed on Dec. 30, 2010;
U.S. patent application Ser. No. 12/982,353 filed on Dec. 30, 2010;
U.S. patent application Ser. No. 12/981,966 filed on Dec. 30, 2010;
U.S. patent application Ser. No. 12/982,453 filed on Dec. 30, 2010;
U.S. patent application Ser. No. 12/982,172 filed on Dec. 30, 2010;
U.S. patent application Ser. No. 12/982,429 filed on Dec. 30, 2010;
U.S. patent application Ser. No. 12/981,990 filed on Dec. 30, 2010;
U.S. patent application Ser. No. 12/982,442 filed on Dec. 30, 2010;
U.S. patent application Ser. No. 12/982,000 filed on Dec. 30, 2010;
U.S. patent application Ser. No. 12/982,010 filed on Dec. 30, 2010;
U.S. patent application Ser. No. 12/982,022 filed on Dec. 30, 2010;
U.S. patent application Ser. No. 12/981,986 filed on Dec. 30, 2010;
U.S. patent application Ser. No. 12/982,236 filed on Dec. 30, 2010;
U.S. patent application Ser. No. 12/982,091 filed on Dec. 30, 2010;
U.S. patent application Ser. No. 12/982,166 filed on Dec. 30, 2010;
U.S. patent application Ser. No. 12/982,340 filed on Dec. 30, 2010;
U.S. patent application Ser. No. 12/982,073 filed on Dec. 30, 2010;
U.S. patent application Ser. No. 12/982,501 filed on Dec. 30, 2010;
U.S. patent application Ser. No. 12/982,206 filed on Dec. 30, 2010;
U.S. patent application Ser. No. 12/982,440 filed on Dec. 30, 2010;
U.S. patent application Ser. No. 12/982,171 filed on Dec. 30, 2010;
U.S. patent application Ser. No. 12/982,223 filed on Dec. 30, 2010;
U.S. patent application Ser. No. 12/982,305 filed on Dec. 30, 2010;
U.S. patent application Ser. No. 12/982,477 filed on Dec. 30, 2010;
U.S. patent application Ser. No. 12/982,331 filed on Dec. 30, 2010;
U.S. patent application Ser. No. 12/982,036 filed on Dec. 30, 2010;
U.S. patent application Ser. No. 12/982,196 filed on Dec. 30, 2010;
U.S. patent application Ser. No. 12/982,391 filed on Dec. 30, 2010;
U.S. patent application Ser. No. 12/982,405 filed on Dec. 30, 2010;
U.S. patent application Ser. No. 12/981,753 filed on Dec. 30, 2010;
U.S. patent application Ser. No. 12/982,414 filed on Dec. 30, 2010;
U.S. patent application Ser. No. 12/981,733 filed on Dec. 30, 2010;
U.S. patent application Ser. No. 12/395,383 filed on Feb. 27, 2009;
U.S. patent application Ser. No. 12/355,537 filed on Jan. 16, 2009;
U.S. patent application Ser. No. 12/355,480 filed on Jan. 16, 2009;
U.S. patent application Ser. No. 12/372,648 filed on Feb. 17, 2009;
U.S. patent application Ser. No. 12/355,413 filed on Jan. 16, 2009, 2009;
U.S. patent application Ser. No. 12/355,377 filed on Jan. 16, 2009, 2009;
U.S. patent application Ser. No. 12/395,470 filed on Feb. 27, 2009; and
U.S. patent application Ser. No. 12/391,009 filed on Feb. 23, 2009;

Each of the above stated applications is hereby incorporated herein by reference in its entirety.

FIELD OF THE INVENTION

Certain embodiments of the invention relate to a broadband gateway. More specifically, certain embodiments of the invention relate to a method and system for managing quality of service via a broadband gateway.

BACKGROUND OF THE INVENTION

With the continuous growth of digital television or broadcast multimedia, and/or broadband access, which may be used in conjunction with online businesses, social networks, and/or other online services and applications, users may desire having access to a larger number of providers and/or a broader range of content in a manner that is flexible and/or suits the users' lifestyles. Most users connect to the Internet using web browsers running on personal computers (PCs). Furthermore, most households may have one or more televisions that may be used to view television and/or multimedia broadcasts. Television broadcasts may include terrestrial TV, Cable-Television (CATV), satellite TV and/or Internet Protocol television (IPTV) based broadcasts. To ensure against unauthorized reception and/or use of TV and/or multimedia broadcast, service providers may require use of dedicated set-top boxes (STBs) that may be used to encrypt broadcast signals communicated from the service providers to generate suitable video and/or audio streams that may be played via televisions and/or other display/playback devices in the household. Furthermore, STBs and/or TVs may support Internet access. Thus, rather than using a computer to access the Internet, a user may find it more convenient to use the flat screen televisions and/or monitors in homes for the same purpose. To do so, for example, an STB connected to a flat screen television may be provided with web browsing software and protocols, and Internet connectivity, which may enable the user to easily access the Internet or check their electronic mail (email), for example, from a convenient and comfortable location such as their living room.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for managing quality of service via a broadband gateway, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for managing quality of service via a broadband gateway. In various embodiments of the invention, a broadband gateway that supports one or more first QoS protocols may determine, based on communications with a plurality of communication devices, whether each of the plurality of communication devices supports the one or more first QoS protocols. The gateway may communicate a result of the determination to a content provider and/or service provider. In this manner, the content provider and/or service provider may determine whether to utilize one or more second QoS protocols to deliver content to a particular one of said plurality of communication devices based on whether said particular of communication devices based on whether said particular one of said plurality of communication devices supports the one or more first QoS protocols.

The one or more first QoS protocols and/or the one or more second QoS protocols may comprise, for example, IEEE 802.1AS, IEEE 802.1Qat, IEEE 802.1Qav, IEEE 802.1 BA, and/or IEEE 802.11e The one or more first QoS protocols and the one or more second QoS protocols may be different or may be the same. The gateway may be operable to map between the one or more first QoS protocols and one or more second QoS protocols in instances that they are different. The one or more first QoS protocols and the one or more second QoS protocols may enable delivering content with guaranteed latency. A headend or other equipment housed in a central office, such as a digital subscriber line access multiplexer (DSLAM), of the provider may be configured based on the results of the determining. Results of the determination may be communicated to the provider upon receiving a request for content from one of the plurality of communication devices. Results of the determination may be stored in memory within the broadband gateway.

The broadband gateway may be operable to handle a plurality of concurrent physical layer connections to one or more network access service providers. The gateway may select which of the physical layer connections to utilize for handling particular traffic based on QoS metrics required for the traffic. Each one of the plurality of physical layer connections may utilize a different physical layer technology than the other ones of the plurality of physical layer connections.

Figure 1:
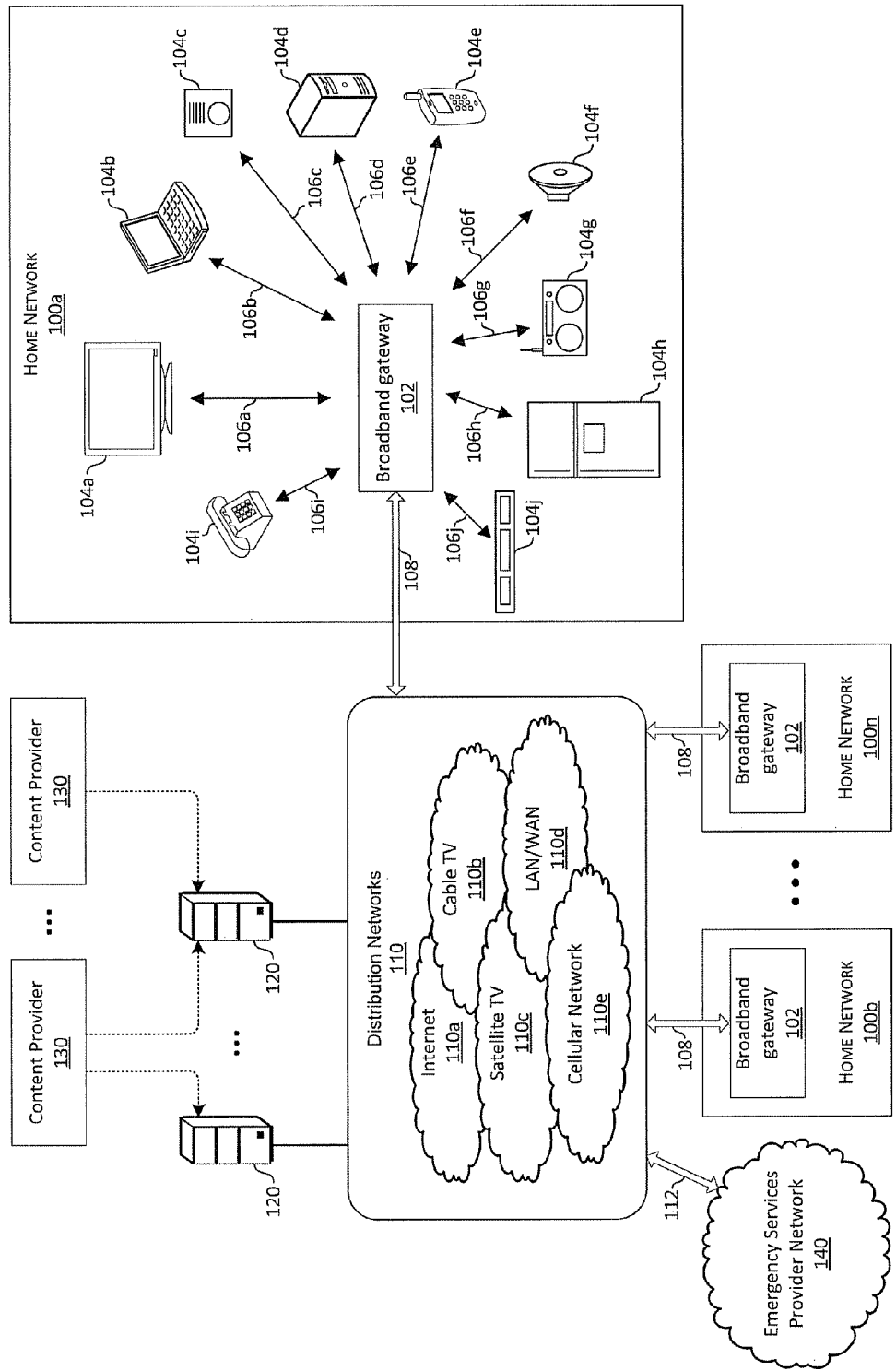
FIG. 1 is a block diagram illustrating an exemplary communication system that comprises a home network serviced by a broadband gateway, in accordance with an embodiment of the invention.

FIG. 1 is a block diagram illustrating an exemplary communication system that comprises a home network serviced by a broadband gateway, in accordance with an embodiment of the invention. Referring to FIG. 1, there is shown a home network 100a, a plurality of distribution networks 110, a plurality of service providers 120, and a plurality of content providers 130. The home network 100a may be serviced by a broadband gateway 102. Also shown in FIG. 1 are additional home networks 100b, . . . , 100n, and an emergency services provider network 140. Each of the home networks 100b, . . . , 100n may also be serviced by a broadband gateway 102.

The service providers 120 may comprise various entities which may provide various services to the devices 104 via the gateway 102 and/or to the gateway 102 itself. Some of the service providers 120 may comprise network access service providers which provide physical layer connections to the gateway 102. Such physical layer connections may then be utilized to access, and/or may be part of, the distribution networks 110. In this regard, "network access service provider" as utilized herein, is distinguished from the more generic term "service provider" which may encompass services other than providing physical layer access to a network. Cable television providers, plain old telephone service (POTS) providers, digital subscriber line (DSL)

providers, cellular providers, WiMAX providers, and satellite providers are examples of network access service providers.

The content providers 130 may generate, capture, and/or package content, such as multimedia content, that may be distributed to end-users. The content may comprise, for example, audio, video, e-book, gaming, and/or other content. The content may be, for example, downloadable and/or streaming, rented and/or purchased. In some instances, a content provider and a service provider may be separate. In some instances, a single provider may provide both content and services. For example, an entity that functions as a network access service provider may also provide content and/or services other than network access and, thus, that entity may also be accurately referred to as a "content provider" and/or a "service provider." Content and/or services that are provided by a content provider 130 and/or a service provider 120 may be provided to the gateway 102 via a physical connection provided by a network access service provider 120.

The plurality of distribution networks 110 may comprise one or more networks that may be operable to enable wireless and/or wired communication among a plurality of entities based on one or more networking and/or communication infrastructures. In this regard, the plurality of distribution networks 110 may be utilized to enable distributing multimedia content generated by the content providers 130, directly and/or via the service providers 120, to end-users. The network connectivity available via the plurality of distribution networks 110 may be based on one or more communication standards and/or protocols. The plurality of distribution networks 110 may comprise, for example, the Internet 110a, a CATV network 110b, a satellite television (TV) network 110c, a wireless local area network/wide area network (LAN/WAN) 110d, and/or a cellular network 110e.

The Internet 110a may comprise a system of interconnected networks to enable exchange of data between a plurality of nodes, based on one or more networking standards, including, for example, the Internet Protocol (IP). For example, the Internet 110a may enable connectivity among a plurality of private and public, academic, business, and/or government nodes and/or networks. The physical connectivity may be provided in the Internet 110a via, for example, the Public Switched Telephone Network (PSTN), copper wires, fiber-optic cables, wireless interfaces, and/or other protocols and/or standards-based interfaces. The transport functionality may be performed in the Internet 110a based on, for example, one or more protocols, such as the Transmission Control Protocol/IP (TCP/IP), for example. The CATV network 110b may comprise suitable distribution nodes, systems, and/or subnetworks that may enable forwarding of communication between CATV providers and a plurality of cable-TV consumers. For example, the CATV network 110b may comprise a network of fiber optics and/or coaxial cables for use in CATV broadcasts. The satellite TV network 110c may comprise suitable distribution nodes, systems, and/or subnetworks that may enable communication of satellite TV broadcast by satellite TV providers to a plurality of consumers. For example, the satellite network 110c may comprise a plurality of orbiting satellite nodes and/or one or more terrestrial centers in a satellite-TV system.

The LAN/WAN network 110d may comprise suitable logic, circuitry, interfaces, and/or code that may be operable to enable implementation of one or more wired and/or wireless LAN or WAN standards and/or protocols. Exemplary WAN technologies comprise, for example, WiMAX-based networks. Exemplary LAN technologies may comprise, for example, those based on IEEE 802.11 standards, including, for example, WiFi-based networks. The cellular network 110e may comprise suitable logic, circuitry, interfaces and/or code that may be operable to enable communication via one or more cellular technologies. Exemplary cellular technologies may comprise Code Division Multiple Access (CDMA), wideband CDMA (WCDMA), CDMA1000, High-Speed Downlink Packet Access (HSDPA), Global System for Mobile Communications (GSM), General Packet Radio Services (GPRS), Enhanced Data Rates for Global Evolution (EDGE), and/or Universal Mobile Telecommunication System (UMTS). The cellular network 110e may comprise, for example, a plurality of control and/or switching nodes, and a plurality of base stations that enable transmission and/or reception of cellular based communications between the cellular network 110e and cellular capable devices.

The home network 100a may correspond to a location that may comprise a plurality of devices 104 which may be serviced and/or managed by the broadband gateway 102. In this regard, the location may be a residence (e.g., home, apartment), a small business, a school, a library, and/or other like settings in which users may want to obtain access to service and/or to content provider networks. The broadband gateway 102 may be utilized in the home network 100a to provide connectivity between the home network 100a and the service providers 120 (and/or the content providers 130) via the distribution networks 110.

The broadband gateway 102 may comprise suitable logic, circuitry, interfaces, and/or code. The gateway 102 may be operable to provide connectivity between one or more devices in a home network, such as the home network 100a, and a plurality of external networks. For example, the broadband gateway 102 may handle a plurality of broadband physical layer connections 108 to the distribution networks 110. The broadband physical layer connections 108 may comprise wired, optical, and/or wireless connections between the broadband gateway 102 and the distribution networks 110, which may enable communication between the broadband gateway 102 and the service providers 120. The broadband gateway 102 may operate as an interface device that may allow one or more service and/or content providers to interact with various devices in the home network. In this regard, the broadband gateway 102 may be operable to perform and/or provide various services that may pertain to enabling and/or facilitating reception of content from one or more content providers, wherein the content may be delivered through one or more services providers. For example, the broadband gateway 102 may be operable to perform such operations as network access related processing (e.g., PHY/MAC, transport layer processing), encryption and/or decryption, user and/or account authentication, and/or at least some of video and/or audio processing operations that may be needed for consumption of multimedia content. The broadband gateway 102 may communicate with various devices in the home network 100, using wired and/or wireless communication links.

A single gateway 102 may be operable to handle multiple physical layer (i.e., layer 1 of the open-systems interconnection model (OSI)) connections 108 to multiple ones, or portions, of the distribution networks 110, where different ones or portions of the distribution network(s) 110 are owned, operated, leased, or otherwise associated with different network access service providers 120. For example, a first network access service provider 120 may provide network access to the gateway 102 via a DSL connection over twisted-pair cabling, and a second network access service provider 120 may provide network access to the gateway 102 via a cable television connection over coaxial cabling. Other exemplary physical layer technologies comprise: physical layer technologies utilized for Ethernet, physical layer technologies utilized for WiMax, physical layer technologies utilized for satellite television, and physical layer technologies utilized for POTS. In some instances, the gateway 102 may be operable to concurrently communicate over multiple physical layer connections provided by multiple network access service providers.

The broadband gateway 102 may support one or more quality of service features and/or protocols. Exemplary QoS protocols may comprise the Audio Video Bridging (AVB) suite of protocols developed by the institute of electrical and electronics engineers (IEEE). Protocols of the AVB suite may comprise IEEE 802.1AS: Timing and Synchronization for Time-Sensitive Applications, IEEE 802.1Qat: Stream Reservation Protocol (SRP), IEEE 802.1Qav: Forwarding and Queuing for Time-Sensitive Streams, IEEE 802.1 BA: Audio Video Bridging Systems, and IEEE 802.11e.

The broadband gateway 102 may also be operable to provide and/or support various other, non-content related services in the home network 100. For example, the broadband gateway 102 may be operable to provide energy management in the home network 100$a$, by controlling and/or adjusting configuration of one or more devices in the home network to reduce power consumption for example.

Devices serviced by, and/or connected with the broadband gateway 102 may comprise content consuming devices and/or other, non-content consuming household or home devices that may be operable to interact with the broadband gateway 102. For example, the broadband gateway 102 may service, and/or may communicate with a plurality of communication devices 104$a$-104$j$ in the home network 100$a$. The communication devices may comprise, for example, one or more of a television 104$a$, a laptop computer 104$b$, a smoke detector, a carbon monoxide detector, and/or a security alarm 104$c$, a computer and/or server 104$d$, a mobile phone 104$e$, a speaker 104$f$, an AM/FM radio 104$g$, a phone 104$h$, an appliance 104$i$ (e.g., refrigerator), and a digital video recorder (DVR) or personal video recorder (PVR) 104$j$. The broadband gateway 102 may interact with each of the home devices 104$a$-104$j$ via links 106$a$-106$j$, which may be supported by the broadband gateway 102 and the corresponding home device. For example, the link 106$a$ between the broadband gateway 102 and the television 104$a$ may comprise a High-Definition Multimedia Interface (HDMI) cable. The link 106$b$ may comprise, for example, a wired Ethernet link, a wireless Ethernet link, a Universal Serial Bus (USB) link, or an IEEE 1394 link. The link 106$c$ may comprise, for example, a two-wire link or a wireless link. The link 106$d$ may comprise, for example, a wired Ethernet link, a wireless Ethernet link, a USB link, or an IEEE 1394 link. The link 106$e$ may comprise, for example, a wireless Ethernet link, a USB link, or a cellular link. The link 106$f$ may comprise speaker wire and/or a wireless link. The link 106$g$ may comprise, for example, AM and/or FM radio transmissions broadcast received using the broadband gateway 102. The link 106$h$ may comprise, for example, a phone line. The link 106$i$ may comprise, for example, a wired or wireless Ethernet link. The link 106$j$ may comprise, for example, a wired or a wireless link. One or more of the devices 104 may support one or more QoS features and/or protocols, such as the AVB suite of protocols.

As illustrated in FIG. 1, a plurality of home networks 100$b$, . . . , 100$n$, may also be connected to the distribution networks 110. These home networks 100$b$, . . . , 100$n$ may operate in substantially the same manner as the home network 100$a$. By having multiple home networks connected to the distribution networks 110, various applications, such as peer-to-peer communication and/or data aggregation operations may be possible by utilizing the broadband gateways 102 in the home networks.

The broadband gateway 102 may also provide emergency-related services in the home network 100$a$. For example, the emergency services provider network 140 may be connected to the distribution networks 110 via a link 112. The emergency services provider network 140 may be associated with one or more emergency service provider entities. For example, a public entity such as a 911 center and/or a private entity such as a security company may be able to interact with the broadband gateway 102 in the home network 100$a$ via the distribution networks 110.

In operation, one or more of the devices 104$a$-104$j$ may request that content be delivered to it via the gateway 102. The gateway 102, before requesting the content from the content provider(s) 130 and/or before allowing the requesting device 104 to access the content, may determine whether the request should be granted. The gateway 102 may make such a determination based on one or more of: attributes of the requested content, attributes of the device requesting the content, attributes of a user requesting the content, or a time at which the content is requested. Past determinations regarding similar content may also factor into a determination of whether to allow access to the content.

Attributes of the content may comprise, for example, ratings assigned to the content by one or more regulatory bodies, agencies, or interest groups, by administrators of the gateway 102, by users of the requesting device 104 and of other ones of the devices 104$a$-104$j$. Additionally or alternatively, attributes of the content may comprise, for example, whether the content contains vulgarity, violence, or nudity. The content may comprise one or more audio tracks or files, one or more video tracks or files, and/or one or more image files. In such instances, various attributes of the content may be determined by, for example, analyzing such tracks or files utilizing pattern recognition algorithms. For example, text which would appear on screen during presentation of the content may be analyzed utilizing an optical character recognition (OCR) algorithm. For another example, speaking content which would be presented via a speaker during presentation of the content may be analyzed using a speech recognition algorithm. The content may comprise one or more tracks or files, such as a closed-captioning track, which may comprise text in, for example, UNICODE format. In such instances, various attributes of the content may be determined by, for example, analyzing the text.

Attributes of the device requesting the content may comprise, for example, one or more of: a location of the requesting device 104, users associated with the requesting device 104, or capabilities of the device. A location of the requesting device 104 may comprise, for example, which building and/or room the device is in. Users associated with the requesting device 104 may comprise, for example, whether children or people without the proper security credentials have access to the requesting device 104. Capabilities of the requesting device 104 may comprise, for example, audio formats, video formats, and/or file types that are supported by the requesting device 104.

Attributes of a user requesting the content may comprise, for example, demographic information such as age, ethnicity, religion, place of residence, whether the user is a parent, and whether the user is a child. In this regard, user profiles associated with users of the devices 104 may be stored in the gateway 102. The gateway 102 may determine a user requesting the content based on one or more sensors which may be one of, or part of, the devices 104 and/or the gateway 102. The gateway 102 and/or one or more of the devices 104 may, for example, comprise a fingerprint scanner. The gateway 102 may, for example, comprise a camera and/or one or more of the devices 104 may comprise a camera, and the gateway 102 may be operable to analyze an image from the camera to perform facial recognition. The gateway 102 may, for example, comprise a microphone and/or one or more of the devices 104 may comprise a microphone, and the gateway 102 may be operable to perform voice recognition.

The gateway 102 may restrict access to content based on the time at which the content is requested. For example, the devices 104 may comprise a home theater with a powerful audio system and the gateway 102 may prevent audio content from being delivered to a loud audio system late at night. Additionally or alternatively, the gateway 102 may allow audio content to be delivered to the home theater late at night but may limit the volume at which the audio content may be consumed. For example, the gateway 102 may allow mid-range and high-frequency audio channels to be delivered to the home theater but may prevent a low frequency channel from being delivered to a subwoofer.

In operation, the gateway 102 may communicate with the devices 104 to determine whether one or more of the devices 104 may support one or more QoS protocols that are also supported by the gateway 102. This discovery of other devices that support one or more QoS protocols may be triggered by auto-negotiation, by an exchange of packets utilizing a layer 2 (i.e. "Data Link" layer) protocol such as LLDP, and/or by an exchange of packets utilizing layer 3 (i.e. "network" layer), or higher layer, protocols. In instances that a device 104x (where x is any of a-j) supports one or more QoS protocols, a value of one or more QoS metrics may be guaranteed for communications over a link 106x between that device and the gateway 102. Exemplary QoS metrics comprise bit rate, latency, jitter, packet or frame loss, and error rate. Similarly, in instances that a device or devices in the network(s) 110 supports one or more QoS protocols, a value of one or more QoS metrics may be guaranteed for communications over a connection between that device and the gateway 102, where the connection comprises at least one physical layer connection 108. Such equipment in the network(s) 110 may comprise, for example, one or more headends or other central-office equipment such as digital subscriber line access multiplexers (DSLAMs), network switches, routers, and/or servers. As a result of discovering QoS support in the devices 104 and in the network(s) 110, the gateway 102 may enable the discovery of end-to-end support of QoS protocols such that one or more QoS metrics may be guaranteed end-to-end. For example, data may be delivered with guaranteed low latency from a service or content provider 130 to a device 104.

In some instances, QoS protocols supported by the devices 104 may be different than QoS protocols supported by devices in the network(s) 110. The gateway 102 may be operable to translate or convert between the protocols, or otherwise utilize both QoS protocols to guarantee one or more QoS metrics, such as latency, end-to-end. For example, a QoS protocol supported by a device 104 may utilize a first mechanism or algorithm to provide guaranteed latency, and a QoS protocol supported by a device in the network(s) 110 may utilize a second mechanism or algorithm to provide guaranteed latency. Accordingly, the gateway 102 may utilize the first QoS protocol for communications with the device 104 and may utilize the second QoS protocol for communications with the device in the network(s) 110.

Figure 2:
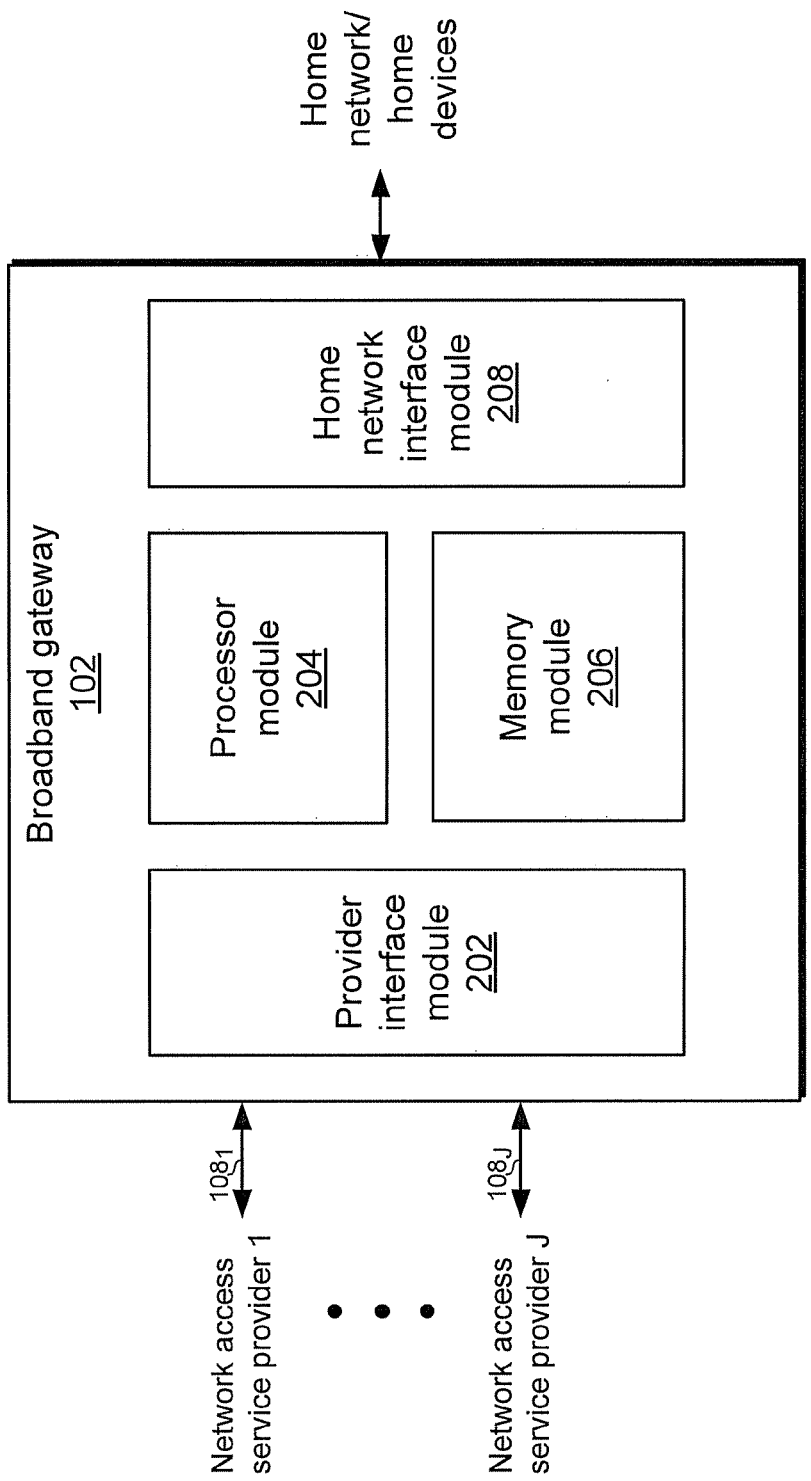
FIG. 2 is a block diagram illustrating an exemplary broadband gateway, in accordance with an embodiment of the invention.

FIG. 2 is a block diagram illustrating an exemplary broadband gateway, in accordance with an embodiment of the invention. Referring to FIG. 2, the broadband gateway 102 may comprise suitable logic, circuitry, code, and/or interfaces that may be operable to provide connectivity between one or more networks, such as the distribution networks 110 shown in FIG. 1, for example, and one or more devices in a home network, such as the home devices 104a-104j in the home network 100a shown in FIG. 1. In this regard, the broadband gateway 102 may operate as an interface device that allows one or more devices in the home network to access one or more networks, and to access various services and/or content via those one or more networks. For example, the broadband gateway 102 may be utilized to enable interaction between the plurality of service providers 120 and/or the plurality of content providers 130, and the home devices 104a-104j.

The broadband gateway 102 may communicate with the various devices via a home network that may comprise wired and/or wireless communication links, such as the home network 100a. In this regard, the broadband gateway 102 may comprise suitable hardware and/or software to provide some or all of the functions and/or operations of one or more of a modem, a router, and a switch. The modem functions and/or operations may be those of a digital subscribed line (DSL) modem, a cable modem, or a wireless cable modem, for example. The router functions and/or operations may be those of a wireless router, for example. The switch functions and/or operations may be those of a network switch, or a local area network (LAN) switch, for example. In some instances, the broadband gateway 102 may communicate with the various devices in the home via more than one home network.

The broadband gateway 102 may comprise one or more modules. Each of these modules may comprise hardware, software, or a combination thereof that may be utilized to perform various operations associated with the broadband gateway 102. In an embodiment of the invention, the broadband gateway 102 may comprise a provider interface module 202, a processor module 204, a memory module 206, and a client network interface module 208. In some instances, the broadband gateway 102 may be such that the various modules listed above may be distributed over multiple devices. Moreover, the modules listed above are provided by way of illustration and not of limitation. Other configurations and/or architectures of the broadband gateway 102 may also be implemented. For example, the broadband gateway 102 may be a virtual gateway that is setup in a network by utilizing virtual machines (VMs) and/or next-generation (NG) data centers.

The provider interface module 202 may comprise suitable logic, circuitry, code, and/or interfaces that may be operable to receive data from and/or send data to one or more service/content providers via one or more physical layer connections 108 to one or more network access service providers. In this regard, each of the physical layer connections $108_1$-$108_j$ may connect the gateway 102 to a difference network access service provider. Each of the physical layer connections 108 may comprise a wired, optical, or wireless connection. Each of the physical layer connections 108 may utilize different physical media and/or different physical layer protocols. For example, the connection $108_1$ may comprise a DSL over twisted-pair connection and the connection $108_J$ may comprise a CATV over coaxial cable connection.

The processor module 204 may comprise suitable logic, circuitry, code, and/or interfaces that may be operable to process data received from the service/content providers and/or data received from one or more devices 104 in the home. Data received from the service/content providers via one or more the physical layer connections $210_1$-$210_J$ may be processed to make it suitable for communication to a device 210 and data from the one or more devices 210 may be processed to make it suitable for communication to the service/content providers via one or more the physical layer connections $210_1$-$210_J$. In this regard, the processor module 204 may comprise one or more portions that are suitable to handle certain types of data such as video data and/or audio data, for example. The processor module 204 may also be operable to generate a graphical user interface (GUI) which may be manipulated via which a user may provide input. The GUI may be displayed as part of an OSD on a local device 104, such as a monitor or television, and may be manipulated via a remote control and/or other input device that communicates directly with the gateway 102. The GUI may be a web-based interface, and a user may interact with it via a computer and web browser. The GUI may be customized based on characteristics of the gateway 102, the device 104 coupled to the gateway, and the service and/or content providers associated with the gateway 102. The processors module 204 may utilize the memory 206 in performing its functions.

The memory module 206 may comprise suitable logic, circuitry, code, and/or interfaces that may be operable to store data utilized in the operations of the broadband gateway 102. For example, the memory module 206 may be utilized to store configuration data, parameters, device information, tracking and/or monitoring information, security information, and intermediate processing data, for example. The memory module 206 may comprise storage media that may be integrated in the broadband gateway 102 and/or may be removable such as a removable storage device.

The client network interface module 208 may comprise suitable logic, circuitry, code, and/or interfaces that may be operable to receive data from and/or send data to one or more devices in the home network. The client network interface module 208 may be operable to support multiple communication protocols, standards, and/or data transport technologies. In this regard, the client network interface module 208 may handle one or more physical layer connections to one or more devices 104. For example, the client network interface module 208 may comprise, one or more wired and/or wireless Ethernet interfaces, one or more analog and/or digital audio outputs, one or more audio/video interfaces such as such as HDMI and DisplayPort, one or more USB interfaces, one or more IEEE 1394, and/or one or more telephone jacks.

The broadband gateway 102 may be operable to provide energy management by varying the configuration of one or more devices in the home network. The broadband gateway 102 may collect and/or store energy-related information of the devices in the home network and/or of the links in the home network, and may utilize such information to control the operation of the home devices. For example, the broadband gateway 102 may utilize channel capacity flexibility and content coding options to minimize and/or optimize power utilization. The broadband gateway 102 may also configure and/or manage the configuration of the network between the broadband gateway 102 and one or more service/content providers based on the energy-related information associated with the devices in the home. For example, at least a portion of the distribution networks 100 may be configured and/or managed in this manner. The broadband gateway 102 may be utilized to display energy-related metrics, including consumption trends and/or costs, for example, and to display any available credits/rewards that may be redeemed by a user. In some instances, when a device in the home network is a certified device, such as a California efficient display, for example, the broadband gateway 102 may be utilized to provide that information to a service/content provider and obtain rewards/credits associated with the use of such certified devices. Moreover, overall network power consumption may be managed by sharing information among multiple interconnected broadband gateways.

The broadband gateway 102 may be operable to adapt and/or enable changes in a subscription model and/or in multimedia delivery characteristics based on the capabilities of the various devices in the home network. For example, high-definition video content may be delivered to certain type of devices, such as digital televisions (DTVs), while low-definition video content and/or text may be delivered to a different type of devices, such as personal mobile devices. In this regard, the broadband gateway 102 may be utilized to reduce bandwidth and/or processing power consumption in the home network. The broadband gateway 200 may also support and/or use multi-transport processing, which may be performed sequentially, in parallel, and/or utilizing distributed processing.

The gateway functionality associated with a user, such as security features, preferences, applications, electronic programming guides (EPGs), and user profile, for example, may be ported from the broadband gateway 102 to one or more other broadband gateways 102 in other locations. In some instances, a visitor may be allowed access to their content outside their service/content provider service area by, for example, classifying the access level for different users and/or by providing limited access to content. Moreover, the broadband gateway 102 may allow multiple user interface software structures by, for example, standardizing an interface to service/content providers and devices in the home network.

The broadband gateway 102 may be operable to broker and/or arbitrate with service/content providers the consumption of certain services, such as music and video, for example. In some instances, the broadband gateway 102 may perform content search, transport discovery, ranking, and/or sorting. These operations may be performed based on content quality, price, quality-of-service (QOS), and network protocols supported by the devices in the home network, such as service level agreements (SLAs), for example.

Various emergency-related services in the home network may be supported by the broadband gateway 102, including allowing first responders to provide alerts to a select group of users by accessing the broadband gateway 102 via secure links provided by the service/content providers. For example, the broadband gateway 102 may enable an emergency service provider, such as those associated with the emergency service provider network 140 described above in FIG. 1, to access one or more devices in the home network.

Customized graphical user interfaces (GUIs) may be generated by the broadband gateway 102, wherein the GUIs may be used to visually display and/or provide interaction with the customized content.

For peer-to-peer communication, the broadband gateway 102 may be utilized to allow enhanced content sharing in a service/content provider network. In this regard, the broadband gateway 102 may be utilized to construct a directory service for peer-to-peer connectivity with friends and family, for example. The broadband gateway 102 may be utilized to provide incentives to users who engage in peer-to-peer communication through, for example, the distribution networks 110. Moreover, the broadband gateway 102 may be utilized to match the content coding to the service type being consumed by the user and to make the necessary allocations through the network with respect to peer-to-peer or conventional Internet programming or broadcast programming.

The broadband gateway 102 may be utilized in connection with constrained network resources, such as time of day, traffic congestion, and the like, for example, to provide incentives for a user to accept a lower cost, lower quality of service that is dynamically configured for current network conditions. In some instances, the broadband gateway 102 may allow enhanced low latency service delivery to client devices in a home network.

The broadband gateway 102 may be operable to run or execute an agent to extract content, rating, copyright, language, privacy rules, and automatically add user generated content, for example. Such agent may be run or executed in connection with the processor module 204 of the broadband gateway 102, for example. In some instances, the broadband gateway 102 may be operable to provide rating-related information or channel prediction to a service/content provider to assist with fast channel change.

Bandwidth optimization by, for example, placing future requests for bandwidth to a service/content provider and accepting the best timeslots provided in return may be enabled by the broadband gateway 102.

The broadband gateway 102 may be operable to combine and/or blend multiple contents for use as single content in the home network. Such combination may be performed in one or more of the modules of the broadband gateway 102. For example, the broadband gateway 102 may blend different video and audio contents for an event by accessing one or more service/content providers and providing automatic and/or manual content synchronization.

The protection, management, and/or tracking of confidential data, such as health and financial records, for example, by tagging the data may be provided by the broadband gateway 102. Only when a user authorizes the transfer of the confidential data will such data be stored and/or aggregated. The broadband gateway 102 may be operable to create a trusted rating mechanism for content. The broadband gateway 102 may be secure against external threats that may be downloaded from outside the home network and may provide a secure domain distribution in the home network. Automated and secured billing and payment services may also be provided by the broadband gateway 102.

The broadband gateway 102 may be operable to utilize client or home device profile information to select layered video service(s) and/or transmission. Such information may be stored, at least temporarily, in the memory module 206 of the broadband gateway 102. In some instances, the programming and/or enhanced video layers received by the broadband gateway 102 may be aggregated midstream by one or more network or routing nodes.

The broadband gateway 102 may support a reduction in the cost of unwatched content by using multi-tier billing for downloaded content, such as video content. The broadband gateway 102 may be utilized to provide a unified payment portal for collecting and/or aggregating charges from multiple service and/or content providers.

In operation, communications with device 104 via the module 208 may enable the gateway 102 to determine QoS protocols supported by one or more of the devices 104. In an embodiment of the invention, the results of this determination may be communicated to one or more providers 120 and/or 130 such that the provider(s) can take advantage of this information when delivering content to the devices 104. For example, when delivering content to a device 104 that supports QoS protocols, a service provider 120 may optimize delivery of the content by enabling one or more QoS protocols along a path through the network(s) 110 to the gateway 102.

In an embodiment of the invention, communications with devices in the network(s) 110 may enable the gateway 102 to determine QoS protocols supported by the network(s) 110. Accordingly, upon detecting (1) that a device 104, which is requesting content, supports QoS protocols; and (2) that a provider 120 and/or network 110, via which the content will be delivered, supports QoS protocols, then the gateway 102 may enable QoS protocols in the provider interface module 202 and in the home network interface module 208 such that one or more QoS metrics, such as latency, may be guaranteed end-to-end.

The gateway 102 may support a first one or more QoS protocols for communications via the provider interface module 202 and may support a second one or more QoS protocols for communications via the home network interface module 208. One or more of the first QoS protocols may be different than one or more of the second QoS protocols. Consequently, the gateway 102 may be operable to convert between the QoS protocols. For example, guaranteeing a particular QoS metric on a connection to the module 202 may comprise adjusting one or more parameters X, and guaranteeing the particular QoS metric on a connection to the module 208 may comprise adjusting one or more parameters Y. Accordingly, the gateway 102 may be operable to map between the parameter(s) X and the parameter(s) Y. Such mapping may be performed by the processor module 204 and the memory module 206, for example.

Figure 3A:
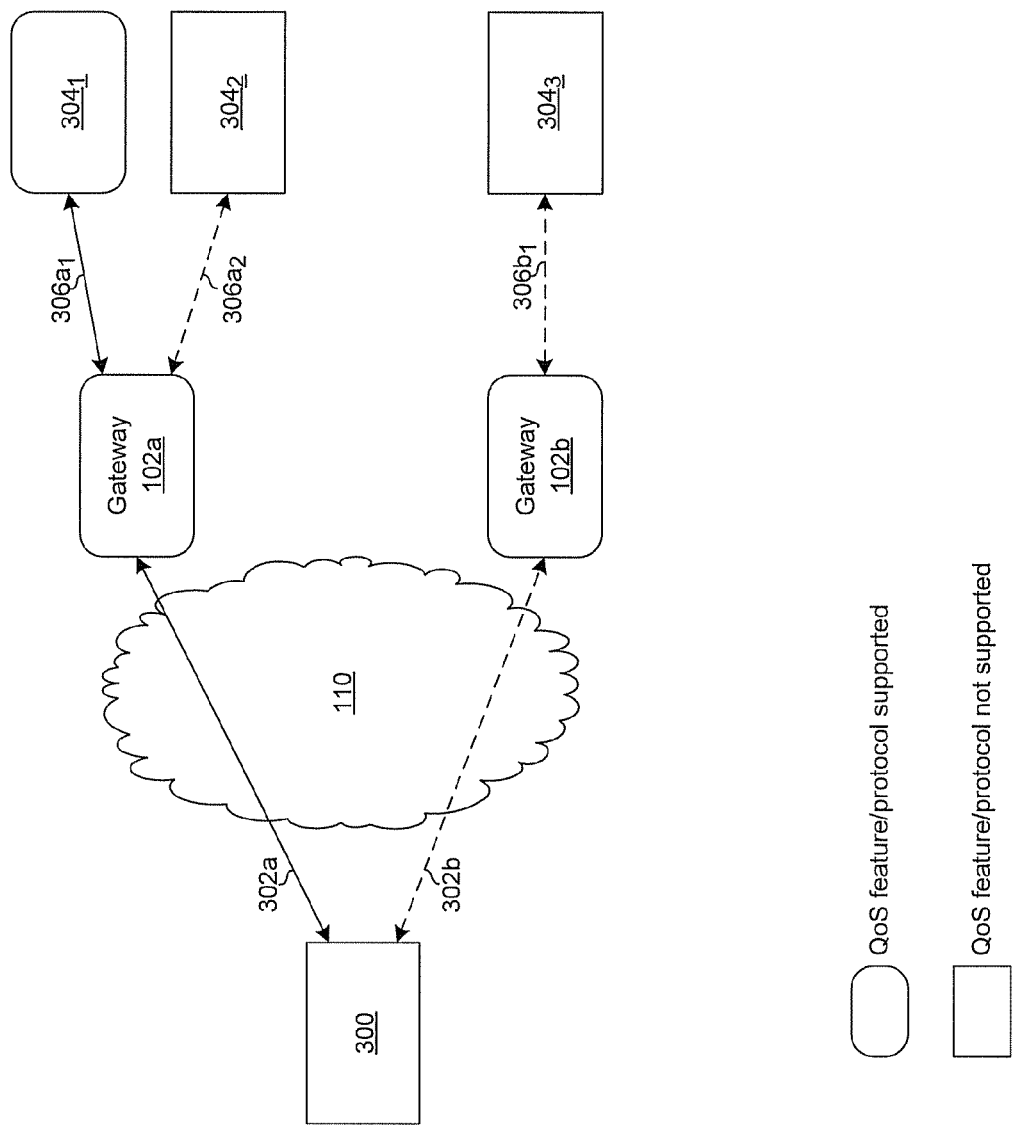
FIG. 3A is a diagram illustrating enabling the use of QoS protocols in a service provider network based on whether devices serviced by a gateway support one or more QoS protocols, in accordance with an embodiment of the invention.

FIG. 3A is a diagram illustrating enabling the use of QoS protocols in a service provider network based on whether a devices serviced by a gateway support one or more QoS protocols, in accordance with an embodiment of the invention. Referring to FIG. 3A, there is shown a network device 300, network paths 302a and 302b, gateways 102a and 102b, devices $304_1$-$304_3$, and connections $306a_1$, $306a_2$, and $306b_1$.

The network(s) 110 may be as described in FIG. 1. The network device 300 may comprise, for example, a headend and/or a server. The device may reside in a network 110 and may be owned, operated, and/or leased by a content and/or service provider. Each of the devices $304_1$-$304_3$ may, for example, correspond to one of the devices 104a-104j. The device $304_1$ may support QoS protocols, whereas the devices $304_2$ and $304_3$ may not.

In operation, the gateway 102a may participate in a discovery protocol to discover the devices $304_1$ and $304_2$, and discover that device $304_1$ supports QoS protocols that are supported by the gateway 102a. The protocol may be implemented at any one or more layers of the OSI model and/or TCP/IP model. The gateway 102a may communicate the results of the determination to one or more devices in the network 110. Accordingly, the network path 302a may be configured to utilize QoS protocols to guarantee one or more QoS metrics, such as latency, may be guaranteed for communications between the device 300 and the device $304_2$.

Conversely, the gateway 102b may participate in a discovery protocol to discover device $304_3$, and discover that device $304_3$ does not support QoS protocols that are supported by the gateway 102b. The gateway 102b may communicate the results of the determination to one or more devices in the network 110. Accordingly, the network path 302b may be configured to disable QoS protocols. Disabling of the QoS protocols may, for example, provide reduced power consumption, freeing up of network resources to handle other traffic, and/or freeing up of network resources to perform other tasks.

Figure 3B:
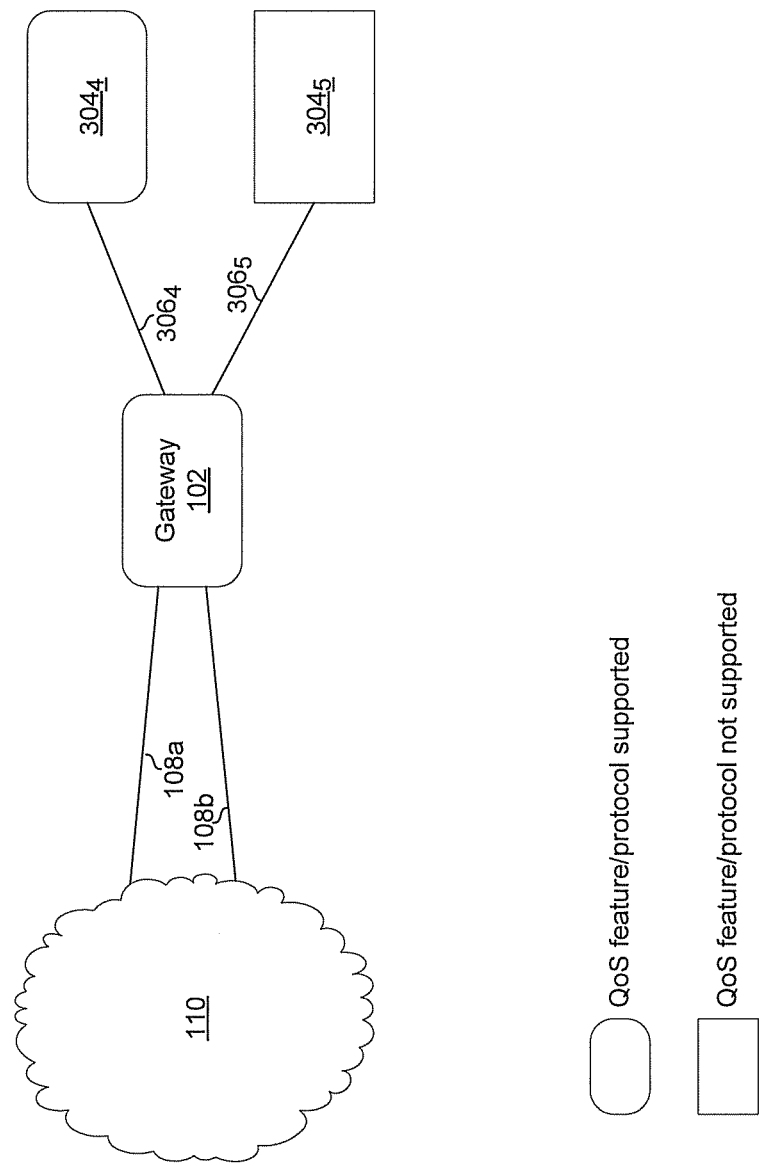
FIG. 3B is a diagram illustrating a gateway operable to handle communications via a plurality of physical layer connections, in accordance with an embodiment of the invention.

FIG. 3B is a diagram illustrating a gateway operable to handle communications via a plurality of physical layer connections, in accordance with an embodiment of the invention. Referring to FIG. 3B, there is shown a gateway 102 coupled to one or more distribution networks 110 via physical layer connections 108a and 108b and coupled to devices $304_4$ and $304_5$ via connections $306_4$ and $306_5$.

In an exemplary embodiment of the invention, the physical layer connection 108a may support one or more QoS protocols whereas the physical layer connection 108b may not support any QoS protocols or may support one or more different QoS protocols. In some instances, the physical layer connections 108a and 108b may each support different QoS protocols. In some instances, the physical layer connection 108a may be better suited for some QoS metrics while the physical layer connection 108b may be better suited for other QoS metrics. For example, the physical layer connection 108a may support a lower bit rate but with low latency, while the physical layer connection 108b may support a higher bit rate but with higher latency or packet jitter.

In operation, the gateway 102 may communicate with the devices $304_4$ and $304_5$ to determine whether the device $304_4$ supports QoS protocols, such as AVB, and that the device $304_5$ does not. The gateway 102 may store the results of this discovery process to memory such as the memory module 206.

Subsequently, upon receiving a request for content or service from the device $304_4$, the gateway 102 may consider the QoS protocols supported by the device $304_4$ when determining whether to request the service or content from a provider 120 and/or 130 via the physical layer connection 108a, via the physical layer connection 108b, or via both physical layer connections 108a and 108b. For example, in instances in which the device $304_4$ may support QoS protocols that enable guaranteed low-latency, then the gateway 102 may choose the physical layer connection that better supports low-latency communications. Conversely, upon receiving a request for content or service from the device $304_5$, the gateway 102 may consider that the device $304_4$ does not support one or more QoS protocols in determining whether to request the content from the network 110 via the physical layer connection 108a, via the physical layer connection 108b, or via both physical layer connections 108a and 108b. In this regard, when providing services or content, the gateway 102 may choose a physical layer connection to optimally utilize network resources and/or to free up network resources for connections requiring guaranteed latency and/or a guaranteed value for one or more other QoS metrics.

Figure 4A:
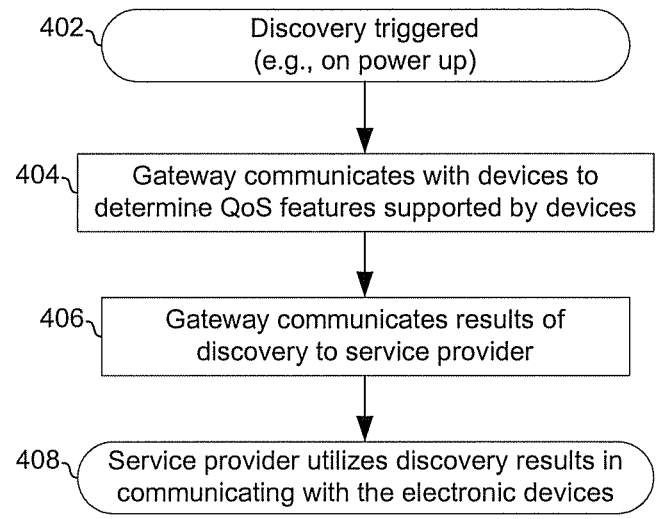
FIG. 4A is a flowchart illustrating exemplary steps for providing guaranteed quality of service (QoS) for delivery of content via a broadband gateway, in accordance with an embodiment of the invention.

FIG. 4A is a flowchart illustrating exemplary steps for providing guaranteed quality of service for delivery of content via a broadband gateway, in accordance with an embodiment of the invention. Referring to FIG. 4A, the exemplary steps may begin with step 402 when the gateway 102 is triggered to discover devices communicatively coupled to it via its home network interface module 208. The discovery may, for example, be triggered upon power up of the gateway 102, power up of a device 104, and/or periodically triggered. In step 404, the gateway 102 and devices 104 may engage in a discovery process whereby the gateway 102 learns which QoS protocols, if any, are supported by which of the devices 104. In step 406, the gateway 102 may communicate the results of the discovery process to a provider 120 and/or 130. In step 408, in delivering content to devices 104 via the gateway 102, the provider(s) may configure network paths over which the content is delivered based on the QoS protocols supported by the devices 104.

Figure 4B:
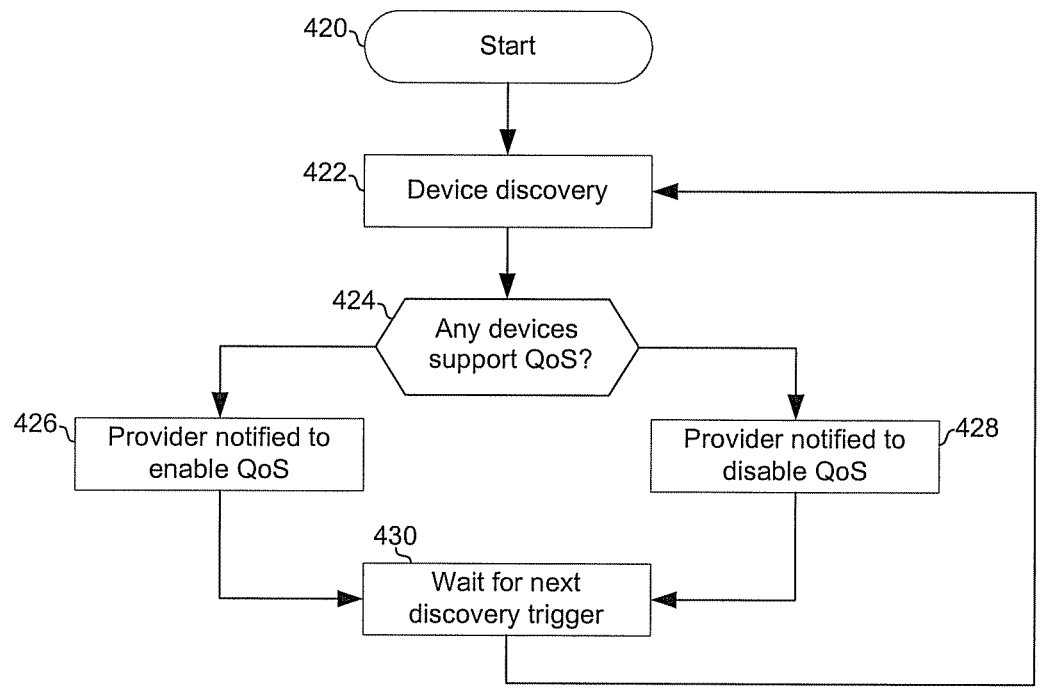
FIG. 4B is a flowchart illustrating exemplary steps for managing quality of service end-to-end via a broadband gateway, in accordance with an embodiment of the invention.

FIG. 4B is a flowchart illustrating exemplary steps for managing quality of service end-to-end via a broadband gateway, in accordance with an embodiment of the invention. Referring to FIG. 4B, after start step 420, in step 422, a gateway 102 may be triggered to discover devices 104 with which it may communicate via its home network interface module 208. Discovery of devices 104 may include discovering the presence of the devices and/or discovering whether the present devices support one or more QoS protocols. In step 424, it is determined whether any devices 104 which support one or more QoS protocols were discovered in step 422. In instance that devices supporting one or more QoS protocols were discovered in step 424, then the exemplary steps may advance to step 426. In step 426, the gateway 102 may notify one or more providers 120 and/or 130 of the devices 104 that support QoS protocols. In this manner, the providers 120 and/or 130 may be enabled to utilize one or more QoS protocols for delivering content to those devices. Subsequent to step 426, the exemplary steps may advance to step 430. In step 430, the gateway 102 may wait for an event to trigger another discovery of devices. Such an event may comprise, for example, a device 104 being powered on, a device 104 being powered off, and/or the passing of a determined amount of time.

Returning to step 424, in instance that no devices supporting one or more QoS protocols were discovered in step 422, then the exemplary steps may advance to step 428. In step 428, the gateway 102 may notify one or more providers 120 and/or 130 that no devices which support one or more QoS protocols are currently being serviced via the gateway 102. In this manner, the providers 120 and/or 130 may be enabled to allocate network resources to other devices and/or gateways that do support one or more QoS protocols. Subsequent to step 428, the exemplary steps may advance to step 430.

Figure 5:
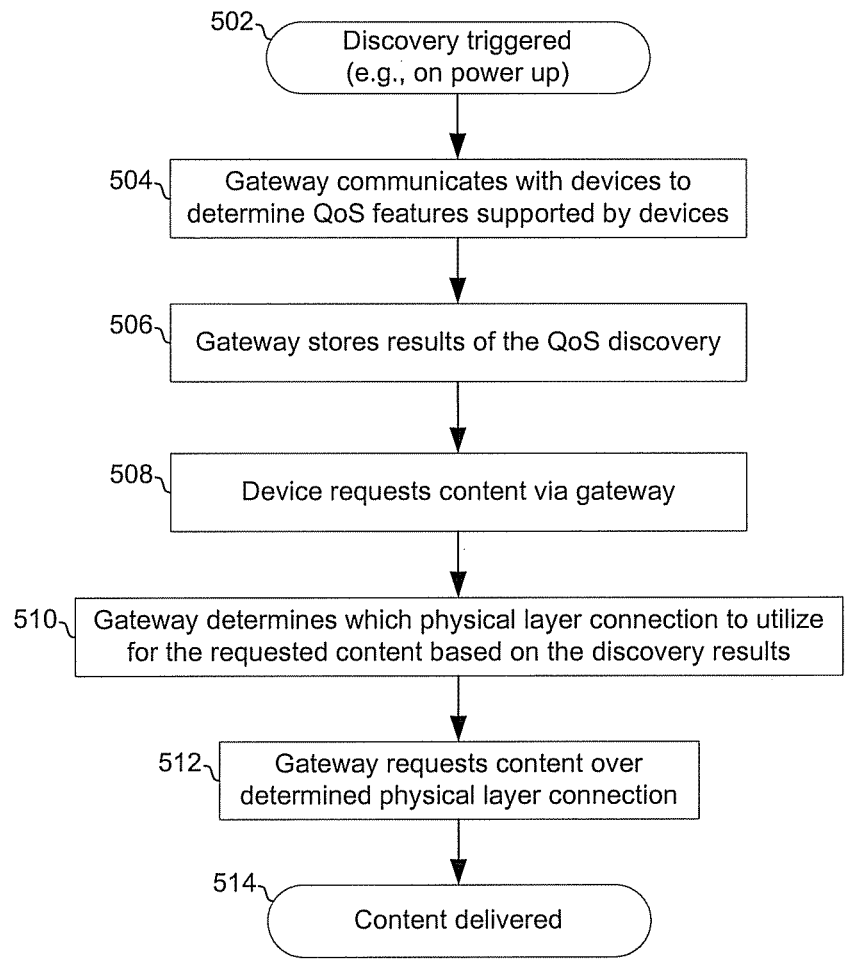
FIG. 5 is a flowchart illustrating exemplary steps for handling content in a gateway that supports multiple concurrent physical layer connections, in accordance with an embodiment of the invention.

FIG. 5 is a flowchart illustrating exemplary steps for handling content in a gateway that supports multiple concurrent physical layer connections, in accordance with an embodiment of the invention. Referring to FIG. 5, the exemplary steps may begin with step 502 when the gateway 102 is triggered to discover capabilities of devices communicatively coupled to it via its home network interface module 208. The discovery may, for example, be triggered upon power up of the gateway 102, power up of a device 104, and/or periodically triggered. In step 504, the gateway 102 and devices 104 may engage in a discovery communications whereby the gateway 102 learns which QoS protocols, if any, are supported by which of the devices 104. In step 506, the gateway 102 may store the results of the discovery in the memory module 206. In step 508, a device 104 may request content via the gateway 102. In step 510, the gateway 102 may determine which one or more physical layer connections 108 to utilize for handling the requested content. The determination may be based on the QoS protocols supported by the device 104 requesting the content. Additionally or alternatively, the determination may be based on the type of content, the quality of service metrics required for handling the content, the present or expected load on the gateway 102, the present or expected load on the provider(s) 120 and/or 130 providing the content, and/or the present or expected load on the network(s) 110. In step 512, the gateway 102 may request the content from its provider via the physical layer connection(s) determined in step 510. In step 512, the provider may deliver the content to the gateway 102 via the determined physical layer connection(s) and the gateway 102 may deliver the content to the device 104 at step 514.

Various aspects of a method and system for content filtering in a broadband gateway are provided herein. In an exemplary embodiment of the invention, a broadband gateway 102 that supports one or more first QoS protocols may determine, based on communications with a plurality of communication devices 104, whether each of the plurality of communication devices 104 supports the one or more first QoS protocols. The gateway 102 may communicate a result of the determination to a content provider and/or service provider 120. In this manner, the content and/or service provider 120 may determine whether to utilize one or more second QoS protocols to deliver content to a particular one of said plurality of communication devices based on whether said particular one of said plurality of communication devices supports the one or more first QoS protocols.

The one or more first QoS protocols and/or the one or more second QoS protocols may comprise, for example, IEEE 802.1AS, IEEE 802.1Qat, IEEE 802.1Qav, and/or IEEE 802.1BA. The one or more first QoS protocols and the one or more second QoS protocols may be different or may be the same. The gateway 102 may be operable to map between the one or more first QoS protocols and one or more second QoS protocols in instances that they are different. The one or more first QoS protocols and the one or more second QoS protocols may enable delivering content with guaranteed latency. A headend 300 or other equipment housed in a central office, such as a digital subscriber line access multiplexer (DSLAM), of the provider 120 may be configured based on the results of the determining. Results of the determination may be stored in memory within the broadband gateway 102.

The broadband gateway 102 may be operable to handle a plurality of concurrent physical layer connections 108 to one or more network access providers. The gateway 102 may select which one or ones of the physical layer connections 108 to utilize for handling particular traffic based on QoS metrics required for the traffic. Each one of the plurality of physical layer connections 108 may utilize a different physical layer technology than the other ones of the plurality of physical layer connections 108.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for managing quality of service via a broadband gateway.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
   detecting, using a broadband gateway, whether each of a plurality of communication devices supports at least one first quality of service (QoS) protocol that is supported by the broadband gateway, the broadband gateway facilitating communication between the plurality of communication devices and at least one content provider, wherein the plurality of physical layer connections are for a plurality of content providers;
   generating, using the broadband gateway, data that represents a result of the detecting;
   transmitting, using the broadband gateway, the data that represents the result to the content provider to determine whether the content provider is to use at least one second QoS protocol to deliver content to a particular one of the plurality of communication devices; and
   selecting, using the broadband gateway, at least one of the plurality of physical layer connections to be used based at least in part on a QoS metric desired for the at least one first QoS protocol.

2. A non-transitory computer readable medium having a program that, when executed by processing circuitry, causes the processing circuitry to:
   detect whether a communication device that is in communication with a broadband gateway supports a first quality of service (QoS) protocol that is supported by the broadband gateway;
   generate data that represents whether the communication device supports the first QoS protocol;
   transmit the data that represents whether the communication device supports the first QoS protocol to a service provider to determine whether the service provider is to use a second QoS protocol to deliver content to the communication device; and
   select at least one of a plurality of physical layer connections to be used to facilitate communication between the service provider and the communication device, based at least in part on a desired QoS metric.

\* \* \* \* \*